United States Patent
Kennedy

(10) Patent No.: US 6,369,705 B1
(45) Date of Patent: Apr. 9, 2002

(54) ALARM MONITORING AND REPORTING SYSTEM

(75) Inventor: Thom Kennedy, 4351 212th Street, Langley, British Columbia (CA), V3A 8C6

(73) Assignee: Thom Kennedy, Langley (CA)

( * ) Notice: Subject to any disclaimer, the term of this patent is extended or adjusted under 35 U.S.C. 154(b) by 0 days.

(21) Appl. No.: 08/985,376

(22) Filed: Dec. 4, 1997

(51) Int. Cl.[7] .............................. G08B 29/00; G08B 1/03
(52) U.S. Cl. .................. 340/506; 340/539; 340/825.36; 340/825.49
(58) Field of Search ................................. 340/539, 506, 340/825.49, 825.36, 825.06, 825.47, 10.32, 825.69, 825.72

(56) References Cited

U.S. PATENT DOCUMENTS

| | | | |
|---|---|---|---|
| 4,130,801 A | 12/1978 | Prygoff | 455/3.2 |
| 4,141,006 A | 2/1979 | Braxton | 340/505 |
| 4,625,319 A | 11/1986 | Krawitz | 375/61 |
| 4,692,742 A | * 9/1987 | Raizen et al. | 340/539 |
| 5,146,612 A | 9/1992 | Grosjean et al. | 455/45 |
| 5,153,598 A | 10/1992 | Alves, Jr. | 342/352 |
| 5,195,126 A | * 3/1993 | Carrier et al. | 379/45 |
| 5,334,974 A | 8/1994 | Simms et al. | 340/990 |
| 5,396,647 A | 3/1995 | Thompson et al. | 455/33.2 |
| 5,463,672 A | 10/1995 | Kage | 379/59 |
| 5,479,482 A | 12/1995 | Grimes | 379/59 |
| 5,497,149 A | 3/1996 | Fast | 340/988 |
| 5,528,674 A | 6/1996 | Reiss, III | 379/102 |
| 5,550,551 A | 8/1996 | Alesio | 342/457 |
| 5,559,520 A | 9/1996 | Barzegar et al. | 342/357 |
| 5,561,701 A | 10/1996 | Ichikawa | 379/57 |
| 5,574,999 A | 11/1996 | Gropper | 455/186.1 |
| 5,621,793 A | 4/1997 | Bednarek et al. | 380/20 |
| 5,625,363 A | 4/1997 | Spilker | 342/352 |
| 5,633,872 A | 5/1997 | Dinkins | 370/312 |
| 5,742,233 A | * 4/1998 | Hoffman et al. | 340/573 |
| 5,787,429 A | * 7/1998 | NIkollin, Jr. | 340/825.54 |
| 5,914,675 A | * 6/1999 | Tognazzini | 340/426 |
| 6,084,510 A | * 7/2000 | Lemelson et al. | 340/539 |

* cited by examiner

*Primary Examiner*—Donnie L. Crosland
(74) *Attorney, Agent, or Firm*—Michael A. Glenn

(57) ABSTRACT

A method and apparatus for monitoring and reporting alarms includes a central monitoring facility which monitors a plurality of remote subscribers. Alarm information is reported to the central monitoring facility by a subscriber. The central monitoring facility causes a summary of the alarm to be transmitted to specific other subscribers. This enables the recipients of the summary to provide follow up reports and to assess how to respond to the report. GPS coordinates are used to identify the location of a reporting subscriber and to select specific other subscribers who should receive the report according to the location of the reporting subscriber.

16 Claims, 3 Drawing Sheets

ALARM MONITORING AND REPORTING SYSTEM

TECHNICAL FIELD OF THE INVENTION

This invention relates to an alarm monitoring and alarm report broadcast system. More particularly, this invention relates to a system for centrally monitoring alarm or event reports from a plurality of remote locations and reporting particulars of the alarm to selected others of the monitored remote locations.

BACKGROUND OF THE INVENTION

It is known to provide a central monitoring facility to monitor alarms at a plurality of remote locations. For example, it is common for security companies to monitor the residential or commercial security systems of customers so as to either dispatch security personnel or advise other appropriate authorities upon detection of an alarm. It is also known to provide communication means enabling a central monitoring facility to query an alarm system at a remote location to determine the alarm status. Such a system is described in U.S. Pat. No. 4,141,006 to Braxton.

It is also known to provide a broadcast system for enabling listeners to monitor only the kind of information of interest to the listener. An example of such system is provided in U.S. Pat. No. 5,574,999 to Gropper which describes a system for broadcasting, for example weather reports, which allow the listener to program a digital code into a receiver so that the receiver triggers only in response to specific digital codes broadcast on the monitored radio channel.

In the last few decades, neighborhood based vigilance programs have become common. Such programs encourage individuals within a neighborhood to report or investigate suspicious activity and to thereby enhance the collective security of the community.

Although the prior art approaches referred to above represent significant advancements in collective security systems, they are nonetheless subject to limitations. In the case of the central monitoring of remote alarms, there is necessarily a delay of several minutes or more before ambulance, security or law enforcement personnel reach the alarm location. In the case of neighborhood vigilance programs, an individual witnessing possibly suspicious activity may be reluctant to call in a false alarm, or may assume that someone else in the neighborhood has reported the incident.

The general object of this invention is to provide an improved security system which takes advantage of community involvement in security monitoring, alleviates the disadvantages of existing approaches, enhances the community's ability to pool information regarding alarm conditions and allows concerned individuals other than the individual reporting the alarm to take corrective, protective or helpful action.

SUMMARY OF THE INVENTION

In one of its broad aspects, the invention comprises an alarm monitoring and reporting system wherein a central monitoring facility monitors a plurality of remote subscribers, receives alarm information from one of the subscribers and transmits to specific other subscribers a report of the alarm condition. This enables the recipients of the report to provide further information by providing their own follow-up report, to assess the relative risk presented by the alarm condition and to take protective or helpful action.

In another of its aspects, the invention comprises such a system wherein the subscribers who are to be advised of a given alarm are selected according to the nature of the alarm.

In a further aspect of the invention, the remote alarm locations are identified using GPS coordinates and the GPS coordinates of the alarm reporting location are used as a geographic reference point for determining which other locations are to receive a report of the alarm. Accordingly, those in the immediate vicinity will be able to provide follow up reports regarding the alarm condition, to assess the risk involved and take appropriate action.

In yet a further aspect, the invention comprises such a system which uses an address scheme comprising a component specifically identifying one remote location and a component identifying a group which includes a remote location. In a more specific aspect of the invention, the addressing scheme includes use of the TCP/IP protocol.

In another aspect, the invention comprises apparatus for use in such a system, said apparatus including means for initiating communication with a central monitoring facility and/or other apparatus, communication means for communicating to said central monitoring facility and/or other apparatus information reporting an alarm at the remote location associated with the apparatus, memory means for recording a unique address assigned to the apparatus by the central monitoring facility, transmission means for transmitting to the central monitoring facility and/or other apparatus the unique address and GPS coordinates associated with the apparatus, and alerting means to draw the attention of a subscriber associated with the apparatus.

Other aspects of the invention will be apparent from the claims and from the detailed description of the preferred embodiment.

DETAILED DESCRIPTION OF PREFERRED EMBODIMENT

The invention may be more fully appreciated by reference to the following description of the preferred embodiment, as well as to the claims and the drawings in which:

SYSTEM OVERVIEW

Figure 1:
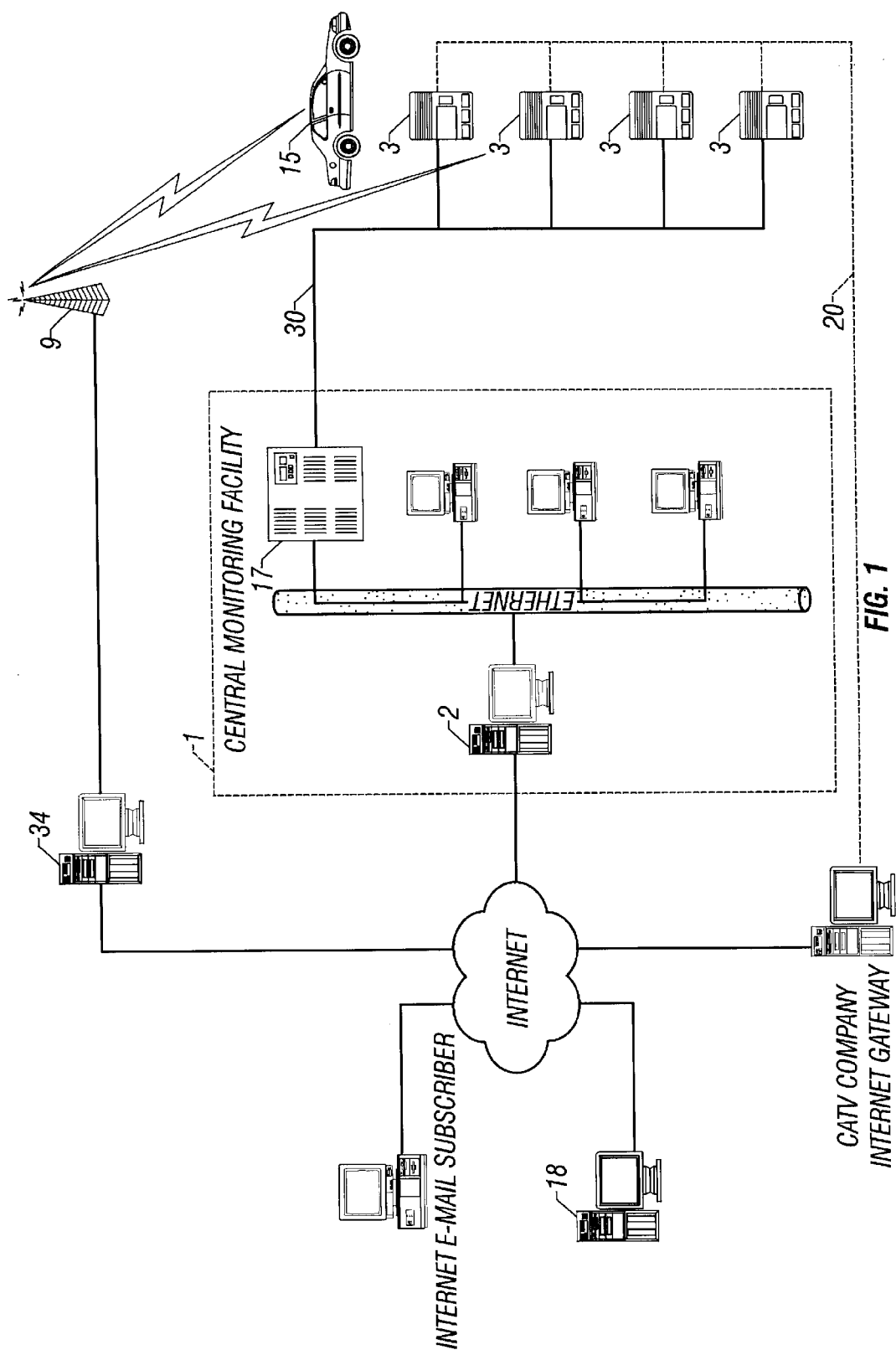
FIG. 1 is a diagrammatic overview of the alarm monitoring and reporting system of the invention.

The following is an overview of the invention. Referring to FIG. 1, a central monitoring facility 1 is provided to monitor a plurality of remote locations 3. The central monitoring facility 1 has associated therewith a data base 2.

A plurality of central monitoring facilities, each monitoring a given area, may be provided with the system of the invention. In such case, a system-wide database 18, or a plurality of distributed or associated databases (not shown) may be provided in addition to database 2.

A plurality of subscriber units 3 are installed at remote locations, for example in various homes or businesses in a city. Each subscriber unit 3 includes means 30 for communicating with the central monitoring facility 1. Communication media may include telephone lines, PCS or cellular communication systems, email, cable or any other suitable means and may use Internet or other communication delivery systems. A voice link or other communication channel between the subscriber unit 3 and the central monitoring facility 1 may be established allowing the subscriber to provide an alarm or event report to one of several operators 32.

Figure 3:
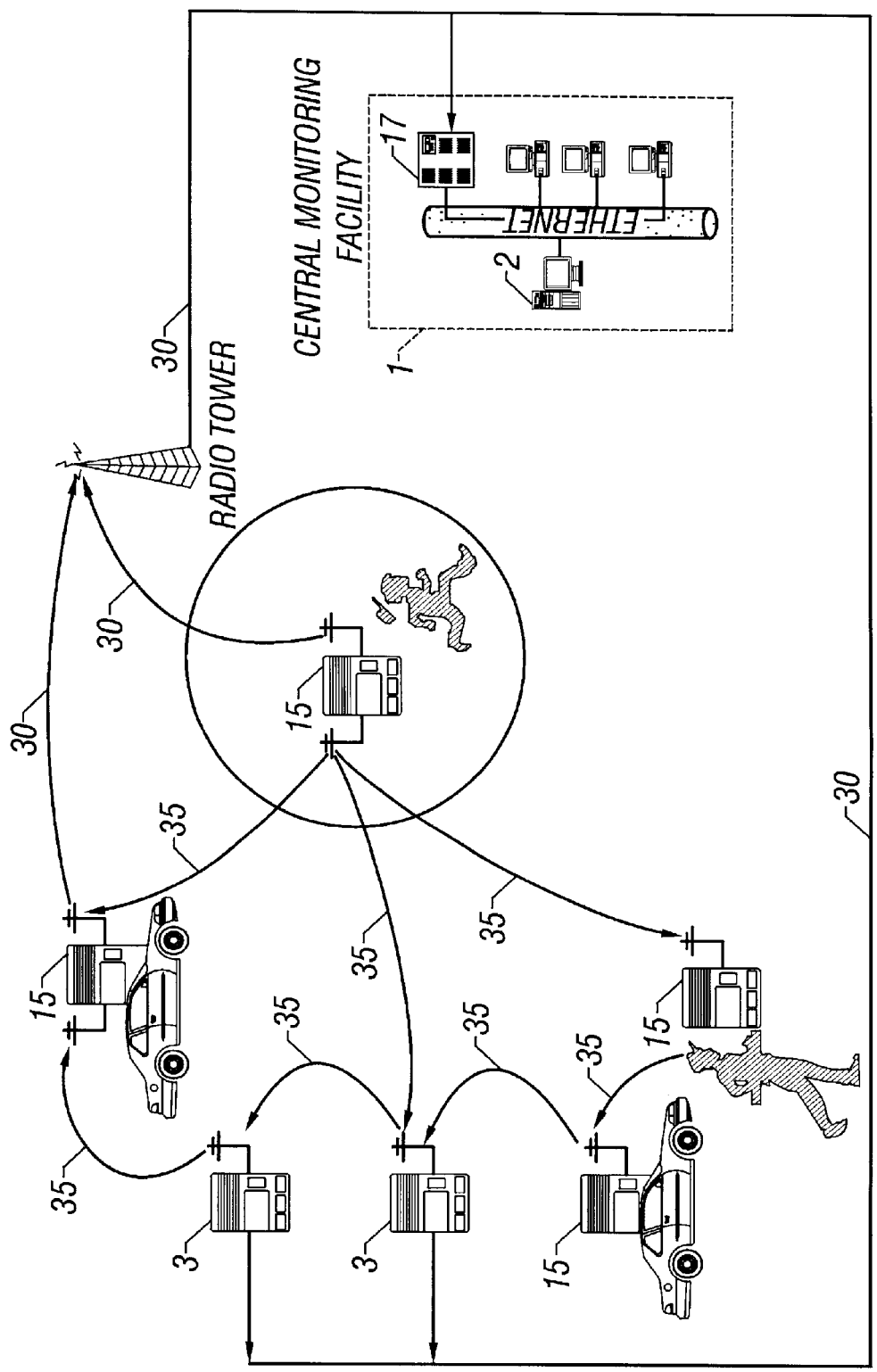
FIG. 3 is a diagrammatic overview of the repeating system as used between subscriber units according to the invention.

Referring to FIG. 3, radio link 35 is also provided to communicate between subscriber units 3 and/or mobile subscriber units 15 within transmission range to provide an alarm report which will be repeated from one subscriber unit to the next until finally reaching the central monitoring facility 1.

At the central monitoring facility 1, a report of the alarm is taken from the subscriber and a decision is made whether the alarm report should be forwarded to a third party agency (not shown), for example a 911 system gateway, a law enforcement agency, a health service provider, etc.

The operator also prepares an alarm report and characterizes the alarm according to predetermined categories. Once the alarm has been categorized, a system-wide or regional database 18 or a local database 2 associated with the central monitoring facility 1 is used to identify which subscribers should receive the report having regard to the kind of alarm involved. One or more digital messages are then broadcast using either dedicated or commercial facilities. In the preferred embodiment, the broadcasts are by radio broadcast through the transmitter 9 of a commercial FM radio station, although it is within the scope of the invention that broadcasts may be by email or other suitable means. The broadcast messages include information identifying which subscribers are targeted by the broadcast. Each of the subscriber units 3 are configured to receive and decode broadcasts in order to determine whether the broadcast targets the subscriber with which the subscriber unit 3 is associated. If so, a variety of visual, audible or other signals may be generated to attract the attention of the subscriber. The digital messages may be tailored according to the level of urgency or pertinence to the subscriber of the alarm in question.

EXAMPLE "A"

The following example "A" will illustrate the operation of the system. Example "A" assumes that several homes in a residential neighborhood are equipped with subscriber units 3 according to the invention. In the example, a subscriber witnesses a break-in at a neighbor's home. The subscriber hits a large alarm button on the subscriber unit to establish a telephone voice link with an operator at the central monitoring facility 1.

As communication is established, the subscriber unit 3 automatically transmits to the central monitoring facility 1 the unit's GPS coordinates, a unique address code assigned to the unit, and a private validation code. Upon receipt of this information, computer means at the central monitoring facility 1 validate the subscriber account then query the database 2 or 18 for other subscriber information which is then displayed to the operator 32. The subscriber provides an oral report of the location of the break-in (e.g., 123 Main Street) and a description of the suspect.

The operator at the monitoring facility prepares an alarm report. The operator also categorizes the alarm according to the pre-established category "In progress—intrusion". Upon doing so, the alarm report and the alarm category are used to determine and identify from the system-wide database 18 those other subscriber units 3 which should receive a report of the break-in.

In the example, the information in the database 18 indicates that "In progress—intrusion" events are to be reported to all subscriber units on the same street as the reporting location, but only if they are within, for example, 500 meters of the reporting unit location. The reporting location is determined from the GPS coordinates downloaded from the reporting unit, or is determined through a database look up based on the unit's unique address downloaded from the unit.

A series of unique addresses for subscriber units 3 within 500 meters of the reporting unit location but which are on Main Street is then extracted from the database. The broadcast processing computer 34 then configures addressing information for targeting a series of broadcast messages to be decoded by the targeted subscriber units. Such addressing information is referred to as "broadcast receive code". One broadcast receive code is configured for each subscriber unit which is to receive a report of the alarm. Each broadcast receive code is then combined with the event report prepared by the operator and with a priority level designation into a message to be broadcast to all subscriber units within the broadcast area served by a commercial FM radio station serving the community in question. Once the message is configured, the broadcast processing computer 34 dispatches the message to an FM transmitter 9 for broadcast.

In the given example, the operator would also contact or put the subscriber in direct contact with a security agency or a law enforcement agency. Where the law enforcement agency is equipped with a subscriber unit, that subscriber unit may be designated as a recipient of all reports for burglaries in progress. Other third party agencies may have the ability to broadcast or access the database on-line, subject to security clearances and pre-authorization.

All operational subscriber units 3 normally monitor the broadcast frequency. When the units on Main Street within 500 meters of the break-in detect that the broadcast receive code is targeting them, they signal the subscriber and display the report on a visual display, e.g. "Burglary in progress, 123 Main St., white male, 5'11", dark brown leather jacket". The nearby subscribers can then observe, take protective action, or provide follow up reports. For example, another neighbor may use a subscriber unit to report that the suspect is now approaching the window at 125 Main Street and a corresponding follow up report can be submitted to the central monitoring facility, and a follow up broadcast may be initiated. In another scenario, another subscriber may report that the suspect is now heading west down a particular alley in a brown sedan with a given license plate number.

It will therefore be appreciated that this invention provides an opportunity for a level of interactivity and vigilance in community security which allows better and more immediate information and alerting to alarm conditions.

In the foregoing example, the system-wide database 18 stored information defining the selection criteria for reporting each type of alarm or event. However, it is within the scope of the invention that the selection criteria be stored in memory means such as a local database 2 associated with the central monitoring facility. In one such embodiment, the operator may make decisions on a case by case basis, in each case selecting a geographic area or radius or other parameter defining who should be notified with an event report. Such criteria may then be dispatched (along with the event report itself) to the broadcast processing computer 34 to identify those specific subscribers meeting the criteria, to define broadcast receive codes to target such subscribers, and to configure the messages to be broadcast.

In another embodiment, the computer associated with the central monitoring facility 1 may go so far as to output a precise set of GPS coordinates. The coordinates alone are then dispatched to the broadcast processing computer 34 and are used to configure the broadcast receive code using the unique addresses for subscribers within the coordinates as recorded in the system-wide database 18.

EXAMPLE "B"

The following example "B" will illustrate the operation of the system when used in a mobile environment. Although the same procedures and practices are used as in example "A", this example "B" expands upon one specific feature of the invention not demonstrated within example "A".

Example "B" assumes that several homes, automobiles and pedestrians in a residential neighborhood are equipped with subscriber units 3 according to the invention. In the example "B", a child subscriber is in the process of being abducted and is carrying a mobile subscriber unit 15. The child subscriber hits a large alarm button on the mobile subscriber unit 15 to establish a telephone voice link with an operator at the central monitoring facility 1. The mobile subscriber unit 15 now attempts to establish a cellular or PCS connection with the central monitoring facility 1. Simultaneously, the mobile subscriber unit 15 broadcasts a radio distress transmission 35 to activate automatic repeaters 11 in nearby subscriber units 3 and nearby mobile subscriber units 15.

These nearby subscriber units 3 and mobile subscriber units 15 now attempt to communicate with the central monitoring facility 1 via their primary communication technique 30 and also simultaneously broadcast a radio distress transmission 35 to activate automatic repeaters in nearby subscriber units 3 and nearby mobile subscriber units 15.

This radio broadcast and repeating 35 provides a redundant backup for should the primary communication 30 fail and provides coverage in areas not serviced by the primary communication system 30 such as in underground parking.

The invention will now be described in more detail.

Subscriber Unit

Figure 2:
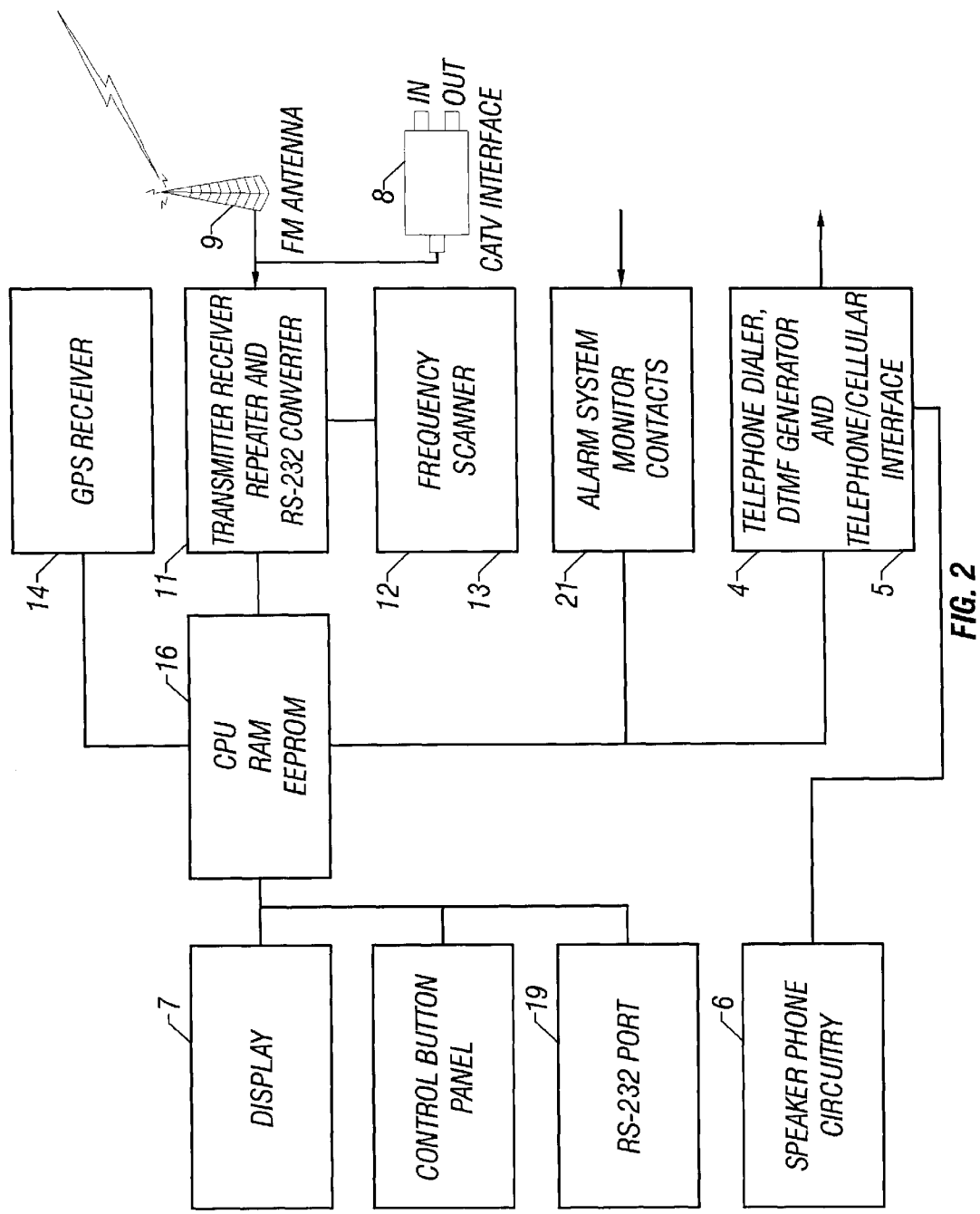
FIG. 2 is a block diagram of the components of the subscriber units according to the invention.

Referring to FIGS. 1 and 2, each subscriber unit includes communication means for establishing communication with the central monitoring facility. Typically, such communication will be through the public switched telephone network and will be by DTMF signaling and oral. However, it is within the scope of the invention that such communication be by any other means, such as through the Internet, email, a cellular telephone network, PCS, 2-way paging, by radio or through a two way communication link 20 using a pre-existing cable or cable television network.

In the preferred embodiment, the medium of communication from subscriber units 3 to the central monitoring facility 1 is through the public switched telephone network. Referring more specifically to FIG. 2, the subscriber unit 3 includes telephone jacks and an automatic dialer 5 for dialing the central monitoring facility 1 when a call is initiated by pressing a large alarm button on the subscriber unit 3.

The subscriber 3 unit includes a speaker phone 6 for enabling hands free oral communication between the subscriber and the operator at the central monitoring facility 1, a visual display 7 for displaying alarm reports, an audible alarm for drawing the attention of the subscriber, a flashing light display, and a keyboard to allow the subscriber to enter information. The unit further includes CATV ports 8 and an RS-232 serial port 19 for connection to serial devices. In the preferred embodiment, the unit also includes a swipe slot for receiving credit cards, debit cards or other cards for recording financial transactions, and a text to speech algorithm for audio playback of text messages for visually impaired subscribers.

The subscriber unit 3 further includes a receiver, which in the preferred embodiment is an FM receiver 10 for receiving FM sideband broadcasts, an integral FM antenna 11, a frequency scanner 12 and a digital filter 13.

A GPS receiver 14 is incorporated into the subscriber unit 3 for use in initializing the unit at a subscriber location and for active use in mobile subscriber units 15. A CPU 16 is provided to control the operation of the subscriber unit 3.

Initialization of the subscriber unit 3 at a subscriber location so as to become subscribed to be monitored and to be able to provide reports of events is as follows. After the unit power is turned on, the CPU defaults to a subroutine to determine whether the unit has previously been initialized or needs to be re-initialized. If not, it undertakes an initialization program including written instructions which appear on the visual display 7 to direct the subscriber to initialize the unit.

The first instruction is for the subscriber to place the unit is an outside area and to turn on a GPS receiver switch on the unit, and to leave the unit in this mode for a predetermined period of time. Upon activation of the GPS receiver switch, the GPS receiver waits (if necessary) and will acquire GPS coordinates once the appropriate GPS satellite signals have been received. The GPS coordinates are loaded into memory and the subscriber is alerted to the completion of this phase of the initialization process.

The subscriber is then directed to install the unit in its intended location in the subscriber's premises. The system then asks the subscriber to input through the keyboard information regarding the subscriber. This may include information such as the residential or commercial address, health information, employees of the business or members of the household, emergency contact numbers, valuable items information, information as to pets, routing instructions for alarm reports and any other information which may be useful. This may further include socio-demographic or political information. The subscriber may have an option as to what information is provided.

The subscriber will also be queried to indicate preferences as to the types and times of reports the subscriber wishes to be alerted to. Accordingly, the subscriber may choose not to be alerted to certain incoming reports. In the preferred embodiment, the central monitoring facility 1 retains the option of overriding such subscriber preferences for certain priority levels of alarm reports.

The subscriber is also asked to input the contact telephone number of the central monitoring facility 1. Such number may be provided as a list of numbers according to geographic areas. The number is stored for use in association with the automatic dialer 5.

When all pertinent information has been collected, the subscriber is directed to test the unit by hitting the alarm button. Doing so triggers the automatic dialer 5 to dial the telephone number of the central monitoring facility 1. Upon establishing an open telephone line with the central monitoring facility, the unit transmits a code indicating that the transmission is pursuant to a unit initialization, and including the GPS location for the unit. The unit also transmits the subscriber inputted information in encrypted form for recording in the database 2 associated with the central monitoring facility and in the system-wide database 18. The central monitoring facility will query the system-wide database 18 to assign a unique address to the subscriber unit 3 and will transmit to the subscriber unit 3 through the telephone line or other communication channel being used:

the unique address for the unit one or more FM frequencies for use by the unit's digital frequency scanner 12 a list of general group address codes to which the unit is authorized to respond The selection of FM frequencies to be transmitted is based on the GPS coordinates received from the subscriber unit 3. The general group address codes are determined based on predetermined criteria to enable general addressing of broadcasts to a plurality of subscriber units 3. In certain cases general group broadcasts rather than individually targeted broadcasts provide more efficient broadcasting. Alternatively, the subscriber may subscribe to topical broadcasts, for example sports, weather or financial news in which case a general group broadcast may also be appropriate.

The subscriber unit 3 then stores the unique address, the FM frequencies, and the general broadcast codes, sets the FM receiver 10 to active mode and disconnects the telephone line.

The subscriber is then required to hit the alarm button once again and to inform the operator at the central monitoring facility 1 that the subscriber is testing the unit. The following steps also occur in normal operation. When the alarm button is pressed, the automatic dialer 5 dials the central monitoring facility 1. Upon establishing an open telephone line or other communication channel, the unit transmits the unique address, a private validation code and the GPS location. Once the unique address, validation code and GPS location are correlated and validated by the central monitoring facility 1, a DTMF or other code is sent to the subscriber unit 3 to activate the input devices to enable communication with the operator. Typically such devices will include a speaker phone for oral communication. The operator at the central monitoring facility 1 then orients the subscriber to the use of the unit and to the protocol for alarm reports. Once this is done, the operator triggers a test broadcast targeting the specific subscriber unit 3.

The digital frequency scanner 12 in the subscriber unit scans the several FM frequencies previously indicated by the central monitoring facility and a filter 13 filters the signal to detect a digital signature packet identifying the signal as one associated with the system of the invention. The digital signature packet is transmitted at timed intervals, e.g. every 10 seconds. If the digital signature packet is detected, the scanner 12 selects that frequency for monitoring by the receiver. If the filter 13 fails to detect the digital signature packet for 10 consecutive intervals, the scanner 12 begins once again scanning the several FM frequencies in order to acquire another signal. If no proper signal can be located and locked, the subscriber unit 3 causes an audible alarm and a written message to be displayed to alert the subscriber to the lack of signal.

Assuming a proper signal is detected and locked on during the initialization test, the subscriber unit 3 will receive a test broadcast including a broadcast receive code containing the unique address allocated to the subscriber unit and a welcoming message to the subscriber. The unit's filter 13 will detect the presence of the unique address identifying the unit and will enable an audible alarm on the unit. The presence of the unique address in the broadcast receive code also enables the display of the transmitted message to the subscriber's visual display 7.

The subscriber confirms to the operator that the welcoming message has been received and the initialization is then complete. In normal operation, the welcoming message is replaced by an event or alarm report.

In normal use, where several reports are received, they can be sorted and displayed based on various criteria such as time and date of receipt, priority level or other such criteria at the election of the subscriber.

Central Monitoring Facility

The operation of the central monitoring facility 1 will now be described.

The central monitoring facility 1 includes a PBX 17 or similar system for handling a plurality of incoming telephone calls and routing them to operators. A computer telephony integration system is associated with the PBX.

A computer 38 and a database 2 are associated with the central monitoring facility. The database 2 may be remote from the facility and may be a distributed database which is accessed through the Internet, and may be shared by a number of central monitoring facilities and with the system-wide database 18. The database stores system level information and subscriber specific information.

The system level information in the database includes:

information regarding participating FM radio stations for various areas across the system, and their respective frequencies;

(optionally) selection criteria for which subscribers should receive particular types of alarm reports the TCP/IP addresses of related databases across the system for national or wider area broadcasts emergency categories of reports which will override the subscriber's stipulation not to receive reports, and associated priority level designations for broadcasts general group broadcast codes The subscriber specific information maintained in the database includes:

security access controls such as the private validation codes of subscriber units whether the subscriber unit is a fixed or mobile unit its normal GPS location in the case of fixed subscriber units subscriber identifying information subscriber characteristics, including health, employees, family, etc.

emergency contact information a correlation of the unique address with the GPS coordinates neighborhood identifying information account information Communications from subscriber units 3 to the central monitoring facility 1 include the transmission of the GPS coordinates of the unit, a unique address assigned to the unit, and a private validation code assigned to the unit. Upon receipt of the unique address, a computer integrated telephony system verifies the unique address and code to ensure that it represents the subscriber's account and that the account is valid. If the account verification fails, the PBX generates a DTMF signal to request a retransmission of the address and code from the subscriber unit. If verification is successful, an oral communication link with an operator is established and a recording unit begins recording the conversation. Simultaneously, the database 2 or 18 is accessed and the name and a synopsis of the subscriber is displayed to the operator's screen monitor.

The operator will take an oral alarm report from the subscriber and will enter pertinent event detail information into the database including a characterization of the nature of the event. As the event detail is inputted, an incident number is assigned to the report. The operator may elect to immediately connect the subscriber by voice to a third party agency and may either continue or discontinue direct communication with the subscriber. The operator may then input a request for a broadcast and a priority level to be used for the broadcast. The broadcast processing computer 34 receives the broadcast request, queries the database 2 or 18 and compiles one or more messages each of which includes the report, the priority level assigned to the broadcast and a broadcast receive code. The broadcast receive code may include the unique address of the subscriber intended to be targeted by the broadcast report, and/or GPS coordinates within which subscribers are to be alerted.

Typically, alarms will be of interest to other subscribers in the immediate vicinity of the reporting subscriber and the subscriber may be taken as the bull's eye of a general target area for the broadcast of an alarm report. In such case, the database 2 is consulted to associate the reporting subscriber unit with its geographic location (if GPS coordinates were not included in the transmission from the reporting unit to the central monitoring facility), and to identify the unique addresses of all other subscriber units within the reporting selection criteria and within the geographic area of concern. However the geographic area of concern is not limited to a strict radius from the reporting location and will often be an irregular area.

For example, a report of a rabid raccoon may be of particular interest to subscribers who own dogs, particularly within a certain radius of the reporting unit. Alarms of burglaries in progress will be of interest to all subscribers within a certain radius but perhaps only for contiguous streets. Reports of underground supply line gas leaks may be of interest only to anyone along the gas line within a certain radius.

The priority level designations maintained in the database 2 or 18 are used to flag a broadcast as being one which may override a certain level of restrictions on reports which are stipulated by the subscriber in the subscriber unit.

Addressing Scheme and Transmission

The database 2 or 18 is therefore used to retrieve a collection of unique addresses according to geographic parameters for subscriber units to be targeted by a report broadcast, as defined by the central monitoring facility or as pre-defined according to selection criteria maintained either at the central monitoring facility or in the system-wide database 18 or inputted on a case by case basis by a human operator.

The unique addresses are configured to include elements identifying the subscriber as being within general classes (geographic or otherwise) and to also identify the unique subscriber. The elements identifying the subscriber as being within general classes allows the creation in appropriate cases of shorter broadcast receive codes thereby reducing the opportunity for the introduction of errors or noise in the transmission process. The preferred embodiment of the invention uses the TCP/IP protocol for the unique addresses. The protocol provides for the use of subnet addresses which may be assigned to subscribers according to the general class in which the subscriber falls. Thus, it is possible to broadcast using only a subnet addressing scheme so as to effectively target all subscribers within a broadcast area who fall within the general class. In such case, the database maintains information associating the TCP/IP address for each subscriber with the subscriber's GPS address and associating the subscriber with the appropriate subnet addresses which cover the subscriber.

A broadcast receive code may therefore be directed to subscribers by class to which they belong, or by designating individually a subscriber unit which is targeted to receive the broadcast.

Upon receipt of the target TCP/IP addresses from the database, the most efficient addressing scheme available based on the collection of targeted TCP/IP addresses and available subnet addresses is determined. Where individual targeting of subscribers is deemed necessary because no subnet addresses are appropriate, the broadcast processing computer will configure a series of broadcast receive codes each of which includes a single TCP/IP address targeting a single subscriber unit. Each broadcast receive code also includes GPS coordinates identifying a geographic zone. Where it is intended that the subscriber units should display the report to the subscriber based on only TCP/IP address matches, the GPS coordinates are set as a default code which is interpreted by the subscriber units as indicating that GPS coordinates are not to be used by the unit in determining whether to display the report. In such cases the subscriber units will look to the TCP/IP address or to subnet address matches to determine whether the unit is targeted by the broadcast. Similarly in cases where all subscriber units within a given area are to display the report, the TCP/IP portion of the broadcast receive code may be set to a default value indicating that the GPS parameters or the subnet address is to be examined to determine whether the unit is targeted. This scheme allows targeting either by GPS location (i.e., within an area mapped by the transmitted GPS coordinates) by TCP/IP address (designating a particular subscriber unit) or by subnet address (for group broadcasts).

Each broadcast receive code is then combined with a descriptor of the FM transmitter to be used, the level of priority of the report, an incident report number and with the report itself into a message and instructions to the transmitter to broadcast, all of which is dispatched by the broadcast processing computer 34 to the transmitter 9. The messages are routed to the appropriate FM transmitter according to the transmitter descriptor. In the preferred embodiment, the FM transmitter 9 is a commercial FM radio station transmitter and transmission is by FM sideband.

Each message is then transmitted to the FM transmitter's broadcast coverage area. The subscriber units receive the message, filter it to detect the broadcast receive code, analyze the broadcast receive code to determine whether the unit is targeted. This is done by determining whether the code includes either the unit's specific TCP/IP address, or a set of GPS coordinates within which the unit falls (by reference to the unit's GPS coordinates acquired upon unit initialization or which are being regularly updated in the case of mobile units) or a subnet address from among those downloaded into the unit upon initialization. If so, a conclusion is made that the unit is targeted by the broadcast.

In such case, the priority level of the broadcast is extracted from the message. The priority level determines to what extent the subscriber may elect to suppress the display of the report on the subscriber unit. In some cases, the highest priority levels will override any restrictions imposed by the subscriber on the display of the report in question. In other cases, lower priority levels allow varying degrees of subscriber imposed restrictions. The CPU will then determine the subscriber set preferences as stored in the unit's memory upon initialization or as later modified by the subscriber. A decision is then made based on the subscriber preferences and the priority level of the broadcast whether to display the report and how the report will be displayed, i.e. flashing screen or light only, audible alarm, etc.

When a subscriber makes a follow up report based on previously received report, the subscriber calls up the event report on the screen of the unit. The CPU notes the incident number of the original report and will include such number in the identification package which is dispatched to the central monitoring facility upon establishing a communication channel for the purposes of the follow up report. This allows the database and the operator to correlate the follow up with the original report.

It will be appreciated that the means of communication specified for the preferred embodiment are illustrative only. For example, it is within the scope of the invention for the subscriber units, the central monitoring facility, the databases, third party agencies and the transmitter to communicate with one another through WAVE facilities provided on the local cable television infrastructure, by radio, microwave, telephone, etc. Appropriate input and output ports are provided on the equipment to enable such communication.

Although the preferred embodiment of the invention specified oral communication between the subscribers and the central monitoring facility, the subscriber units may also be connected to a building security system or other security systems for automated rather than oral reports to the central monitoring facility. The subscriber unit is accordingly provided with alarm system monitor contacts.

Mobile Subscriber Units—Including Vehicular and Portable Mobile Units

In the case of mobile subscriber units 15, the initialization of the unit occurs in the same manner as for the stationary subscriber units described above. In normal monitoring operation, the GPS receiver in the unit is kept on and regularly feeds the GPS coordinates to the CPU 16 of the unit.

It will be appreciated that if a mobile unit is not within range of the transmitter used for a given broadcast, the unit will simply not receive the message. If the unit is within range, the unit will undergo an identical process as for the stationary units as described above. The broadcast receive code will be examined to determine whether the code includes the TCP/IP address of the unit, or the unit is within the GPS coordinates included in the code, if any, or if the subnet address included in the code matches one of those stored in the unit's memory.

It will be appreciated by persons skilled in the art that certain variations on the preferred embodiment may be practiced without departing from the scope of the invention.

What is claimed is:

1. A method for monitoring and disseminating event reports from a plurality of monitored remote locations, comprising the steps of:
    subscribing said plurality of monitored remote locations to be monitored by a central monitoring facility and to report to said central monitoring facility alarm conditions at said monitored remote locations;
    providing said central monitoring facility for monitoring event reports from said subscribed plurality of monitored remote locations;
    receiving a communication from a reporting one of said monitored remote locations, said communication providing a report of an event at said reporting location;
    said central monitoring facility communicating said event report for reception and decoding by at least a plurality of said monitored remote locations other than said reporting location, said plurality of monitored remote locations being configured to decode said event report according to the geographic proximity of said monitored remote locations to said reporting location.

2. A method as in claim 1 wherein said plurality of monitored remote locations is selected by the central monitoring facility according to the nature of the event.

3. A method as in claim 2 wherein the step of selecting comprises the steps of:
    an operator at said central monitoring facility characterizing the nature of the event; and,
    consulting a database which identifies the plurality of monitored remote locations which should receive said event report based on the nature of the event and the geographic proximity of said monitored remote locations to said reporting location.

4. A method as in claim 1 wherein each of said remote locations are identified using GPS coordinates and the GPS coordinates of said reporting location are used as a geographic reference point for selecting which of said monitored remote locations are to receive said event report.

5. A method as in claim 4 further including the steps of:
    associating each of said remote locations with an address code;
    the central monitoring facility causing a transmission of said event report in association with a plurality of said address codes.

6. A method as in claim 5 wherein said transmission is by radio.

7. A method according to anyone of the preceding claims wherein said event is an emergency.

8. A method as in claim 5 further comprising the step of:
    causing apparatus associated with at least one of said remote locations to monitor said transmission for the presence of an address code associated with said apparatus.

9. A method as in claim 5 wherein said address code is based on the TCP/IP protocol.

10. A method as in claim 4 further including the steps of:
    associating each of said remote locations with an address code;
    the central monitoring facility causing a transmission of said alarm report in association with at least one set of GPS coordinates.

11. A method as in claim 10 wherein said transmission is by radio.

12. A method as in claim 5 further comprising the step of:
    causing apparatus associated with at least one of said remote locations to monitor said transmission for the presence of GPS coordinates within which said apparatus is located.

13. A method as in claim 5 wherein said transmission is by Internet.

14. A method as in claim 5 wherein said transmission is by telephone.

15. A method according to any one of claim 1, 2, 3, 4, 5, or 6 wherein at least one of said remote locations is a mobile location.

16. A method according to any one of the claim 1, 2, 3, 4, 5, or 6 wherein said apparatus includes means for receiving and repeating a broadcast from another said apparatus.

* * * * *